Dec. 13, 1932.　　　　　E. DAVIS　　　　　1,890,673
AUTOMATIC PRESSURE CONTROL MECHANISM FOR FLUID MOTORS
Filed Jan. 3, 1928
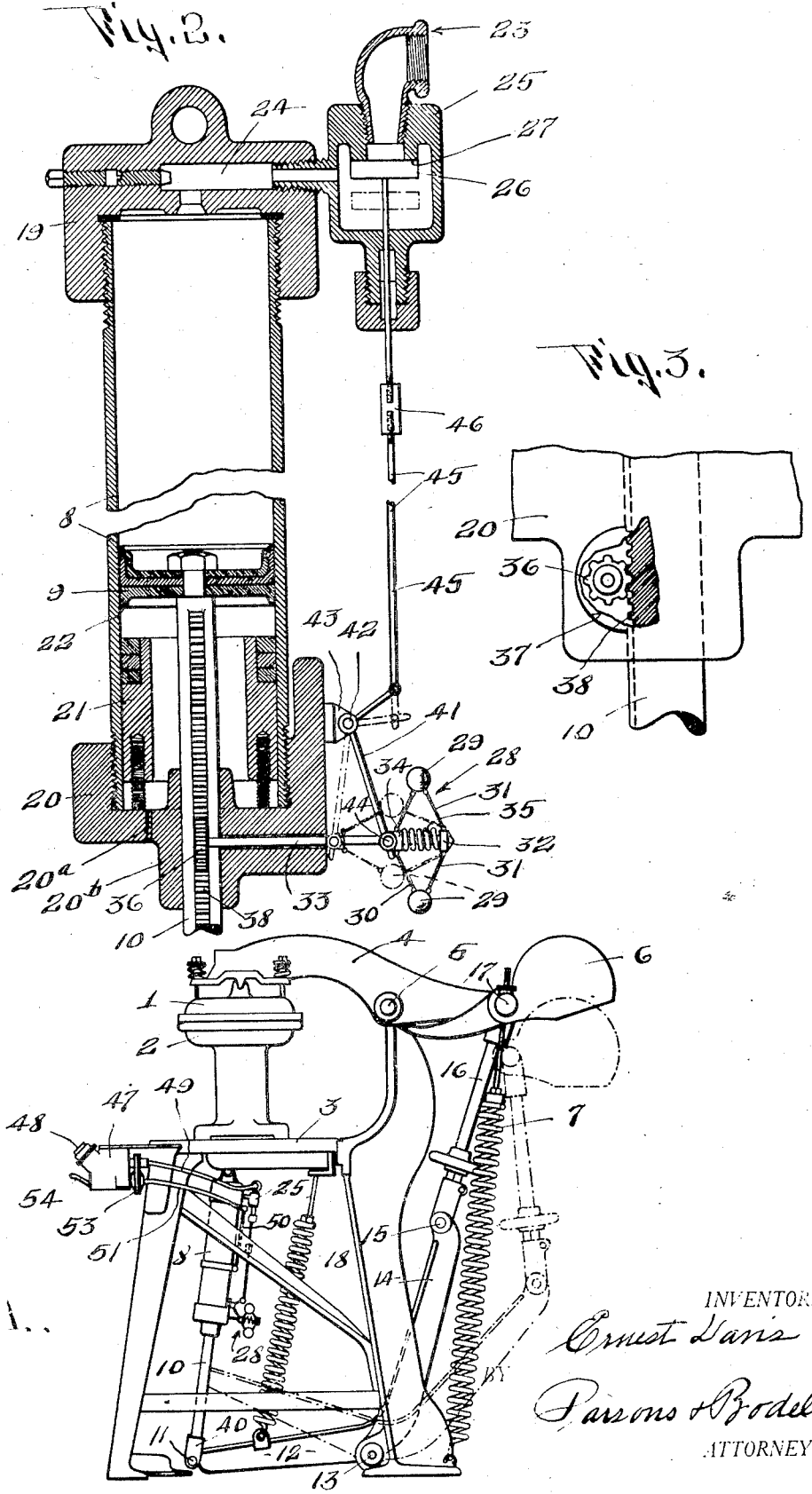
INVENTOR.
Ernest Davis
BY
Parsons & Bodell
ATTORNEYS.

Patented Dec. 13, 1932

1,890,673

UNITED STATES PATENT OFFICE

ERNEST DAVIS, OF SYRACUSE, NEW YORK, ASSIGNOR TO THE PROSPERITY COMPANY INC., OF SYRACUSE, NEW YORK, A CORPORATION OF NEW YORK

AUTOMATIC PRESSURE CONTROL MECHANISM FOR FLUID MOTORS

Application filed January 3, 1928. Serial No. 244,361.

This invention has for its object, a particularly simple and efficient mechanism for automatically governing the control valve for a fluid operated motor and particularly, a mechanism to be used in connection with a machine having an opening and closing movement as garment and laundry pressing machines whereby a violent closing of the press is prevented and also whereby the flow or pressure of the motive fluid as steam or air is not affected or obstructed by condensation and oil therein and does not require a fine adjustment of a manually operated regulating valve, nor readjustment of a regulating valve as conditions change.

The invention consists in the novel features and in the combinations and constructions hereinafter set forth and claimed.

In describing this invention, reference is had to the accompaying drawing in which like characters designate corresponding parts in all the views.

Figure 1 is an elevation of a pressing machine embodying one form of my invention.

Figure 2 is an enlarged fragmentary sectional view, partly broken away, of a cylinder provided with governing means forming the subject matter of my invention.

Figure 3 is an enlarged fragmentary detail view of the rack and pinion connection for operating the centrifugal governor.

In pressing machines as garment and laundry pressing machines, the power first applied must be sufficient to overcome the inertia of the movable pressing element or head and after the head gains momentum, it ordinarily closes with a jarring or slamming action whether the motive fluid is steam or air. Also, particularly when steam is the motive fluid, the press may operate with full pressure on starting, but after water of condensation gets in the steam line, the passage of the steam is obstructed more or less and the pressure delivered decreases and further the conditions are constantly varying so that the pressure does not stay up to requirements and frequent manipulation or normal adjustment of a control is required in order to keep the pressure up to standard. The operator must know that adjustment is necessary, and if he is not on the alert may turn out considerable work not properly pressed before sensing that adjustment is necessary. By my invention, the pressure of the steam or other fluid can be kept uniform and not affected by water or oil obstructing the inlet pipe. Furthermore, the speed of the operation of a machine element having a reciprocating oscillating or opening and closing movement can be kept uniform and the effect of undue momentum overcome. The actuating mechanism is applicable to any machine or mechanism, having an opening and closing movement other than presses, for instance, doors, which are operated by power.

This actuating mechanism comprises generally a fluid operated motor and mechanism actuated thereby including a part having a back and forth movement, a normally open valve in the intake pipe to the motor, a governor connected to said part to be actuated thereby during the closing of the machine or apparatus and the opening thereof, and connected to the valve to close it more or less in accordance with the speed imparted thereto by the actuating part. It will be understood that the speed of the actuating part is necessarily in synchronism with the closing and opening movement of the movable element of the press or the machine.

I have here illustrated the invention as embodied in a conventional type of garment and laundry pressing machine comprising a head 1 movable toward and from a buck 2 mounted on a bench or table 3 which is supported by a suitable frame. The head 1 is carried by a motion transmitting part as a lever 4 pivoted between its ends at 5 to the frame and carrying the head 1 at its front end and having a suitable counterweight 6 at its rear end. Suitable countersprings as 7 are also connected to the rear end of the lever, the weight and the springs tending to open the press as the motor is a single acting one.

The actuating means include a fluid operated motor and connections between the motor and the press head, these connections including the lever 4.

The motor is here shown as a cylinder 8 and a single acting piston 9 movable in the cylinder and having a rod 10 pivoted at 11 to the front end of a horizontal lever 12 pivotally connected at 13 to the frame. The lever 12 has an upwardly extending arm 14 pivoted at 15 to a link 16 which is pivoted at 17 to the rear arm of the lever 4. The arm 14 and link 16 constitute a toggle. A spring 18 is also connected to the lever 12 to act in conjunction with the weight 6 and spring 7.

The cylinder 8 is provided with heads 19 and 20 at its upper and lower ends respectively and the piston rod 10 is guided in the lower head 20. Also a gland or packing 21 is located in the lower end of the cylinder to coact with an annular flange 22 on the lower side of the piston when the piston is at the end of its out stroke, in order to seal the cylinder against leakage of air or steam or other motive fluid out of the cylinder when the press is closed and the piston at the end of its power stroke. The head 20 has a vent 20$^a$ to prevent the cylinder from becoming air bound. It will be understood that in the machine here illustrated, the pressure of the motive fluid in the cylinder holds the press closed although this is not a feature of the invention. Also, the construction of the parts just described form no part of this invention.

23 is a feed conduit for a motive fluid as steam or air leading into the upper end of the cylinder through a passage 24 in the head 19, this conduit including a valve casing 25 adjacent the cylinder.

26 is a normally wide open regulating valve in the valve casing 25 and movable into engagement with the seat 27 therein by the governor to be presently described.

28 designates the governor which may be of any suitable form, size and construction, that shown being of the centrifugal type and including the usual fly balls 29 carried by links 30 and 31, the links 31 being pivoted to a hub 32 on a rotating shaft 33 and the links 30 pivoted to a sliding hub 34 on the shaft 33. The sliding of the hub 34 is against the action of a spring 35 when the balls are thrown outwardly by the centrifugal force. As the construction of centrifugal governors is well known, further description is thought to be unnecessary.

The shaft 33 is actuated by any motion transmitting part having a back and forth movement whether this back and forth movement is a reciprocating or an oscillating one. The shaft 33 is here shown as actuated by the piston rod 10 and as journalled in a bearing 20$^b$ formed in the head 20 of the cylinder, the shaft having a pinion 36 located within a recess 37 in said head 20 and meshing with rack teeth 38 on the piston rod. The lower ends of the rod and sleeve are secured to a yoke or clevis 40 and the clevis is pivoted at 11 to the arm 12.

The connections between the governor and the valve 26 may be of any suitable construction, and as here shown include a bell crank lever 41 pivoted at its angle at 42 to a bracket 43 on one side of the cylinder or the lower head 20 thereof, one arm of the bell crank lever 41 being pivoted at 44 to the sliding hub 34 and the other arm being connected to a rod 45 which in turn is connected through a suitable coupling 46 to the stem of the valve 26.

The flow of motive fluid through the feed pipe 23 is controlled by any suitable operator-operated mechanism from a main feed pipe and includes valve mechanism of the conventional type shown diagrammatically at 47 and supported at the front of the machine. This valve mechanism is operated by a push button 48 to let the motive fluid flow to the cylinder.

The air is also permitted to exhaust from the cylinder by the valve mechanism 47 when operated by a lever 54. This valve mechanism forms no part of this invention and for an understanding of the operation of the machine, it is merely necessary to bear in mind that the motive fluid passes in through the pipe 23 when a suitable valve is actuated by the operator and exhausts out through the same pipe and through an exhaust port when the valve returns to its normal position.

In operation, when the intake valve is open, the motive fluid passes from the pipe 23 through the valve chamber 25 past the normally wide open valve 26 into the cylinder and actuates the piston. When the piston reaches a certain predetermined speed, the centrifugal governor is actuated by the rack 38 and pinion 36 sufficiently to close or partly close the valve 26 thus cutting off the flow of fluid so that the piston and hence the head 1 slows down and when it slows down to a predetermined point, the valve 26 automatically opens by the operation of the centrifugal governor. Thus the speed of the head or the motor actuating the head controls the closing thereof and the governing mechanism can be set to shut off the flow of motive fluid at any speed. As the motive fluid also exhausts through the pipe 23, a similar governing action takes place during the opening of the press.

Any water or oil in the motive fluid which would otherwise obstruct the passage thereof is ineffective to obstruct the passage as the valve 26 is large enough to accommodate the free passage of water or condensation or drops of oil therethrough and hence, when the pressure of the motive fluid is once determined, no adjustment of hand regulating valves and the like are necessary in order to keep the pressure uniform.

What I claim is:

In a pressing machine cooperative pressing elements; actuating mechanism for moving one of said elements to open and close the press; means tending to open the press; a fluid operated cylinder and piston motor for closing the press against the action of said means tending to open the same; a rack formed on the piston rod of the motor; a gear meshing with the rack and rotated thereby during movement of the motor upon closing and opening of the press; a conduit connected with the motor for the supply and exhaust of working fluid; a manual valve in the conduit; a normally open control valve in the conduit between the manual valve and the motor; a governor connected to the gear and rotated thereby; connections between the governor and the normally open control valve for operating said control valve toward closed position as the speed of rotation of the governor increases and thereby retards the flow of working fluid through the conduit and slows down the speed of the motor when said motor moves in either direction.

In testimony whereof, I have hereunto signed my name, at Syracuse, in the county of Onondaga, and in the State of New York this 8th day of Dec., 1927.

ERNEST DAVIS.